(12) United States Patent
Barfuss et al.

(10) Patent No.: US 7,447,343 B2
(45) Date of Patent: Nov. 4, 2008

(54) METHOD FOR AUTOMATIC OBJECT MARKING IN MEDICAL IMAGING

(75) Inventors: Helmut Barfuss, Erlangen (DE); Karl Barth, Hoechstadt (DE); Michael Scheuering, Erlangen (DE); Armin Schneider, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 775 days.

(21) Appl. No.: 10/948,303

(22) Filed: Sep. 24, 2004

(65) Prior Publication Data

US 2005/0069185 A1 Mar. 31, 2005

(30) Foreign Application Priority Data

Sep. 26, 2003 (DE) ................. 103 44 805

(51) Int. Cl.
*G06K 9/00* (2006.01)
(52) U.S. Cl. .................. 382/128; 382/299; 378/21
(58) Field of Classification Search ........... 382/103, 382/106, 128–133, 154, 162, 168, 181, 184, 382/189, 191, 194, 199–203, 219, 220, 232, 382/254, 274, 276, 285–299, 305, 134, 255; 378/4, 20, 21, 29; 600/425; 715/848
See application file for complete search history.

(56) References Cited

U.S. PATENT DOCUMENTS

| | | | |
|---|---|---|---|
| 6,246,784 B1 * | 6/2001 | Summers et al. ............ 382/128 |
| 6,429,884 B1 * | 8/2002 | Budz et al. .................. 715/848 |
| 6,473,634 B1 * | 10/2002 | Barni ......................... 600/425 |
| 7,146,031 B1 * | 12/2006 | Hartman et al. ............. 382/132 |
| 7,292,721 B2 * | 11/2007 | Arnold ....................... 382/131 |
| 2002/0028006 A1 * | 3/2002 | Novak et al. ................ 382/128 |

OTHER PUBLICATIONS

Udo Jendrysiak, "Spektrum Der Wissenschaft—Segmentierung von Schnittbildern", Dossier Jan. 1999.

* cited by examiner

*Primary Examiner*—Seyed Azarian
(74) *Attorney, Agent, or Firm*—Harness, Dickey & Pierce, PLC

(57) ABSTRACT

A method is for automatic object marking in medical imaging. The method includes coupled displaying of different display modes of at least one image data record containing at least one object to be marked, in different display windows on at least one computer screen. The method further includes transferring the position of an initial point, selected by the user as part of an object-determining first marking, to the computer. Then, pattern recognition techniques are applied to the environment of the initial point of the first marking, resulting in a detailed high-resolution second marking of the object. Thereafter, reversible coding of the second marking of the image data records present in the computer takes place. Finally, the marked object is accentuated relative to its environment in the image data records on the screen.

26 Claims, 2 Drawing Sheets

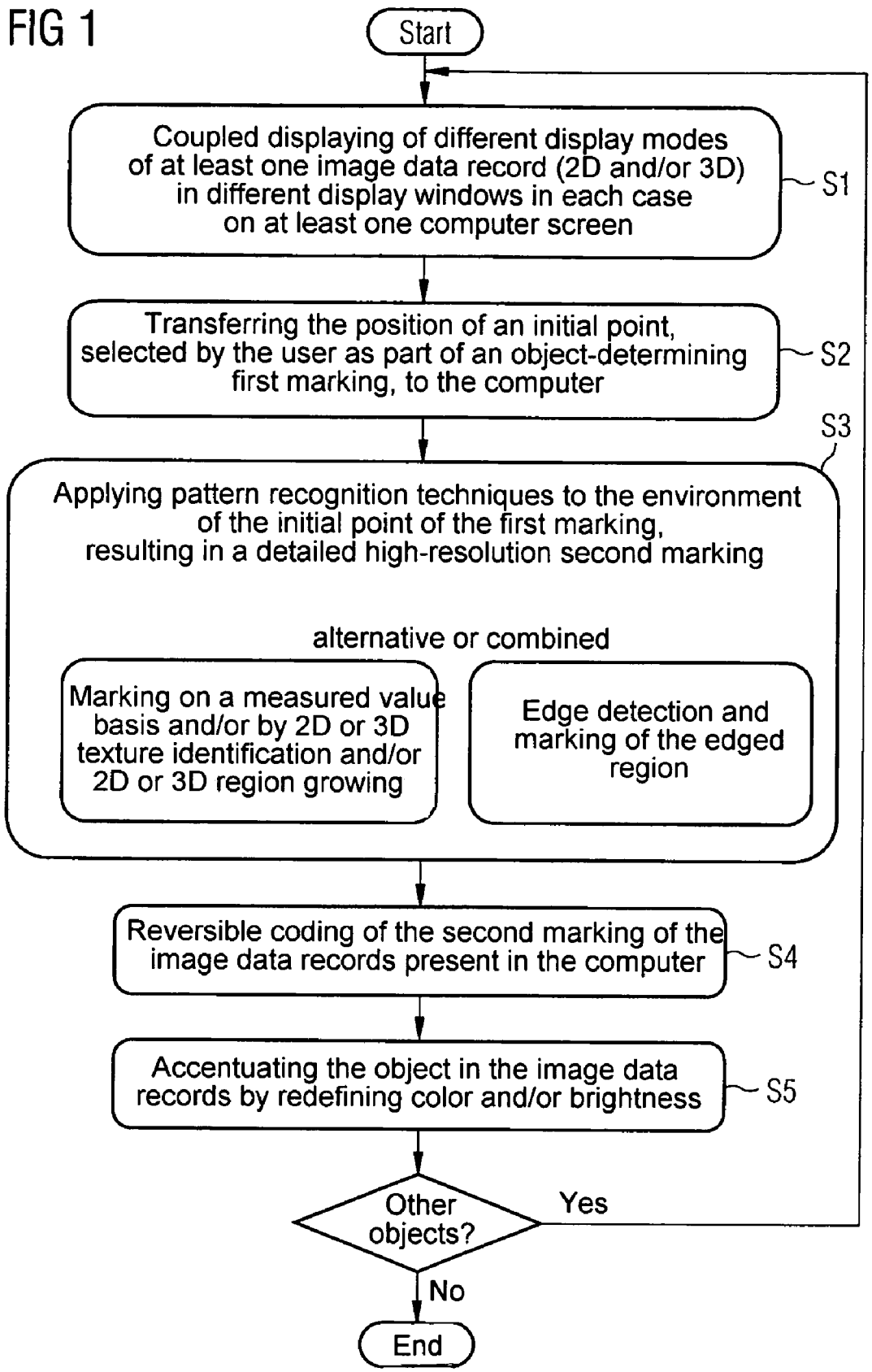

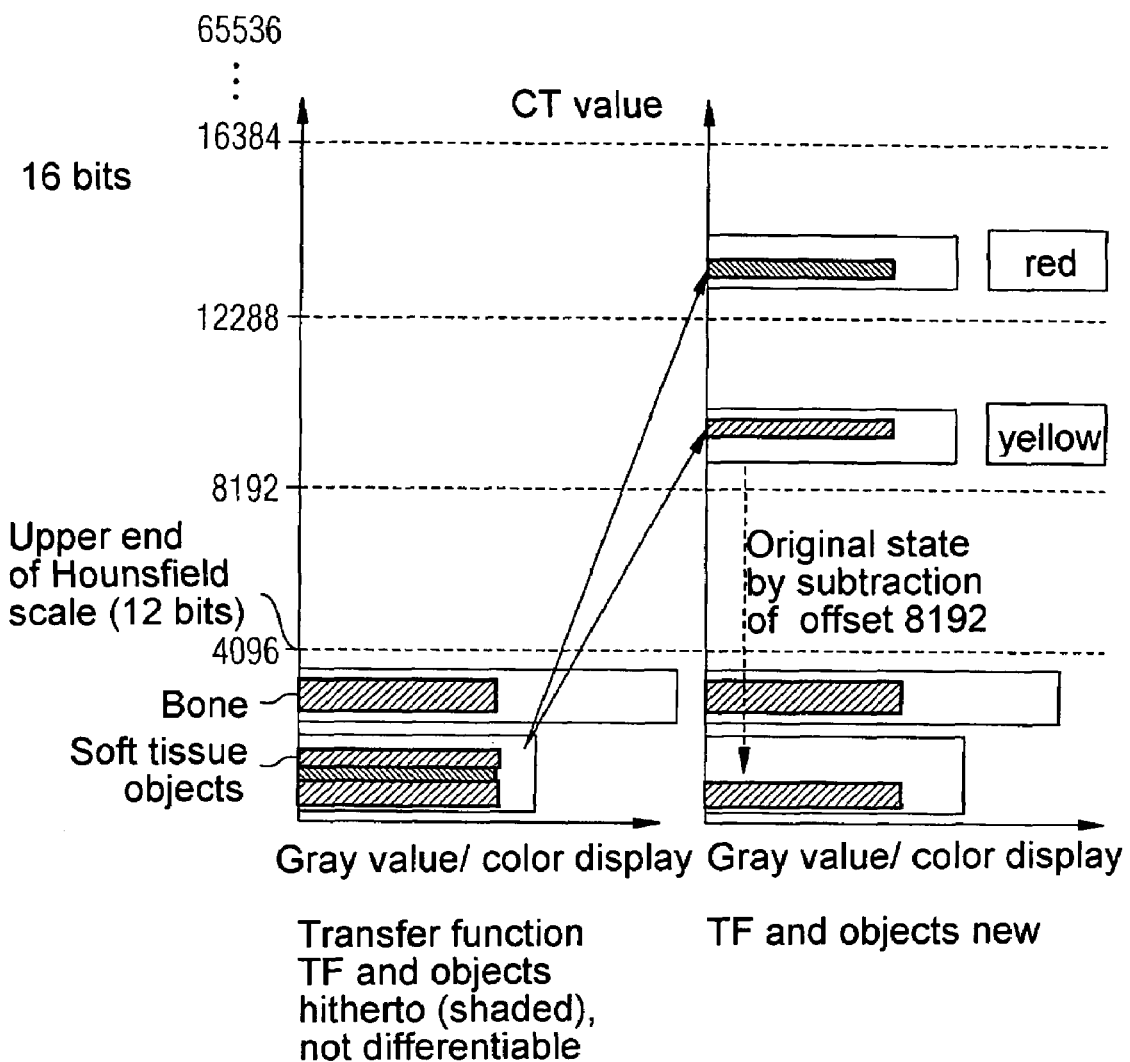

METHOD FOR AUTOMATIC OBJECT MARKING IN MEDICAL IMAGING

The present application hereby claims priority under 35 U.S.C. §119 on German patent application number DE 103 44 805.5 filed Sep. 26, 2003, the entire contents of which are hereby incorporated herein by reference.

FIELD OF THE INVENTION

The present invention relates generally to the detection and display of objects in previously acquired 2D or 3D image data records in medical imaging. The present invention relates in particular to software-supported automatic marking of difficult to identify or inaccessible, and in particular diseased, objects or processes (e.g. tumors) in order to facilitate the user's orientation in the relevant display image.

BACKGROUND OF THE INVENTION

In medical imaging, x-ray pictures or sectional views of the kind obtained using modern, in particular tomographic, methods (CT, MRT, PET, etc.) are visualized to the user in the form of 2D or 3D data records on conventional or also semitransparent screens. In general, an unmodified display of such a data record is inadequate to enable the user (generally the physician) to make a reliable diagnosis or undertake planning of a therapeutic or surgical intervention on the basis of said data record. The aim is therefore generally to make anatomical objects of interest, in particular tumors, stand out clearly from the anatomical environment.

For this purpose a number of methods have been developed which enable individual measured values to be assigned to relevant anatomical structures such as nerves or fatty tissue, bone or muscle equivalent tissue but also to non-anatomical structures such as foreign bodies. These methods are known as segmentation and form the basis on which the user can observe, for example, a patient's bone structure in isolation from other tissue on the screen.

Of particular interest in medical imaging in relation to segmentation are tumors and other pathological changes within organs, as these are very poorly contrasted using conventional imaging methods, particularly in spatial display (i.e. in local space).

A tumor may be very similar to its tissue of origin in many respects. Differences are not always apparent in tomographic images. However, even if a tumor is roughly detected, it is often impossible to precisely determine the boundary with surrounding healthy tissue in the tomographic image. Even using contrast media (known as tracers in nuclear medicine), reliable and rapid segmentation is not always possible.

For this reason the user currently still has to rely to a large extent on his trained eye in conjunction with diagnostic experience in order to detect such critical structures in two- or three-dimensional CT or MRT images. In the absence of suitable programs, many physicians nowadays still segment manually: they plot the object contours into two-dimensional layer images or trace the object contour with only moderate accuracy, whereas a computer program matches the straight polyline to immediately adjacent edge pieces.

Display methods based on this in medical engineering include multiplanar reformatting (MPR), shaded surface display (SSD), maximum intensity projection (MIP) and volume rendering (VR), the MPR method more or less constituting only a 2D visualization, but of layers in all main planes or in any orientations in space (referred to in this context as orthogonal MPR and free MPR). The SSD method requires segmentation as described above, continuous surface patching being performed on the segmented subvolumes and the visible surfaces in some cases being displayed with shading.

With the MIP method, the object under examination is penetrated with imaginary so-called eye rays (from the observer's direction), the maximum intensity value in the volume being determined along each eye ray and finally displayed. This method is actually only suitable for displaying high-contrast objects such as bones or vessels filled with contrast medium.

Lastly, in the case of VR methods the entire volume is displayed with the computer taking account of local transparencies and/or shadings in such a way that the observer is conveyed a plastic representation of the structures in the volume. For this purpose, the eye ray is modulated in the entire object depth with the relevant opacity or transparency values of all the "irradiated" voxels. By means of a so-called transfer function which assigns a transparency value and an RGB value (red-green-blue value) to each gray value of the volume in question, a 3D image with depth effect is obtained on a computer screen from the totality of the eye rays. In this way, by means of the VR method, all the distinctly different objects present in the volume in question can be displayed in a 3D image in a clearly differentiable manner e.g. in different colors.

Particularly organs at a certain depth in the object under examination can be better accentuated by transparency than e.g. using the above described techniques. However, even using well conceived transfer functions and optimized illumination or shading within the framework of the latest VR methods it is not possible to display, in an easily differentiable manner, adjacent objects which differ only little in respect of their measured values. Specifically in computer tomography, "differ only little" means that these objects fall within a narrow CT value range, e.g. in a range from 1 to 10 Hounsfield units. Such difficult to differentiate objects include tumors, metastases or edemas which differ only slightly, not only in terms of brightness but also in respect of their structure relative to the surrounding healthy tissue.

The company ConVis, Medizinische Datenverarbeitung GmbH & Co. KG, Mainz, has developed a method of segmenting difficult to differentiate objects such as tumors and has presented it in the magazine "Spektrum der Wissenschaft", Issue 1/1999 in an article by Udo Jendrysiak on pages 24 to 29. The method is essentially based on determining texture measurements such as the average gray value of a region, the average deviation of all its gray values from this mean value, the homogeneity measured by the frequency distribution of the gray values, the entropy (a measure for the disorder within a region) and the average run length (i.e. the number of consecutive voxels of the same gray value in a certain direction).

The texture measurements are determined on a surface which must have a certain minimum size. Consequently, this method requires a relatively large amount of computing time and can only indicate whether or not a region belongs to a tumor for the entire texture surface but not for an individual voxel.

The starting region for tumor segmentation consists of a polyline in a plane section which need not necessarily correspond to the original tomographic image planes. In this plane the method first determines the texture measurements of surfaces inside and outside the starting region, which, however, only provides a rough localization since, because of their size, the texture surfaces are to some extent too bulky to reach the edge of the tumor throughout. In a postprocessing phase, the environment is searched for hitherto not found tumor portions and the result in the edge area is optimized. Depending on the size of the tumor the entire process requires two to three minutes. The accuracy particularly at the edges often leaves much to be desired.

SUMMARY OF THE INVENTION

An object of an embodiment of the present invention is therefore to provide a method whereby weakly contrasting but self-contained associated objects can be selectively accentuated in medical 2-D or 3-D image data records and thereby displayed directly and in an easily differentiable manner in their corresponding environment.

This object may be achieved according to an embodiment.

According to an embodiment of the invention a method for automatic object marking in medical imaging therefore includes the following:

- coupled displaying of different display modes of at least one image data record containing at least one object to be marked, in different display windows of at least one computer screen
- transferring the position of an initial point, selected by the user as part of an object-determining first marking, to the computer
- applying pattern recognition techniques to the environment of the initial point of the first marking, resulting in a detailed high-resolution second marking of the object
- reversible coding of the second marking of the image data records present in the computer
- accentuation of the marked object relative to its environment in the image data records on the screen According to an embodiment of the invention, if a plurality of objects to be marked are present, all the steps of the above-mentioned method are repeated until all the objects to be marked are displayed in an accentuated and differentiable manner in the image records.

In an advantageous embodiment of the invention, for coupled display, a display designated as the main display of an image data record appears in a first display window of the first display screen and at least one other display designated as a secondary display of this or other image data records appears in other display windows either likewise on the first or on other screens.

According to an embodiment of the invention, all the displays of the image data records appear in the display windows in the same perspective, i.e. in the same position, orientation and projection.

Advantageously an object to be marked is displayed better contrasted in at least one secondary display compared to the main display or other secondary displays.

According to an embodiment of the invention, at least one secondary display is a layer-wise display which can be rotated and/or shifted in space as required by the user.

The rotation of a layer-wise display in the corresponding display image is advantageously limited to a single axis of rotation.

For limiting the rotation to a single axis of rotation, the viewing direction defined by the central eye ray is inventively superimposed on the rotation-limited view by use of suitable graphics.

Under certain circumstances it is advantageous for the images of other secondary displays to originate from different imaging modalities.

In a further embodiment of the invention, an initial point is found automatically by the computer as part of the first marking.

For automatic first marking of this kind, at least one image data record is filtered in such a way that, in it, the region of the object to be marked that is central for an initial point to be found can be maximally contrasted and localized automatically using image processing operations.

For automatic finding of a starting voxel, it is additionally advantageous that images of other imaging modalities be used in which the central region of the object to be marked shows the best possible contrast.

The second marking is advantageously performed by way of measured value-based and/or texture-based and/or edge-based segmentation algorithms or iterative 2D or 3D dilatation and/or 2D or 3D region growing.

According to an embodiment of the invention the marked object is accentuated by way of newly defined color and/or brightness values in such a way that the object appears optimally delimited with respect to its environment.

It may be advantageous to perform the marking and accentuating of the object to be marked in a complementary manner. Thus, identifiable tissue may be first identified and pre-marked according to the first three process steps and then all non premarked enclosed voxel regions may be marked and the premarking may be undone.

According to an embodiment of the invention, a medical instrument is superimposed on the marked image data record on the basis of a navigation system.

According to an embodiment of the invention, a system is included which is suitable for implementing the method.

According to an embodiment of the invention a computer software product is included which implements the method when it is running on a computer device.

BRIEF DESCRIPTION OF THE DRAWINGS

Further advantages, features and characteristics of the present invention will now be explained in more detail with reference to exemplary embodiments and the accompanying drawings.

FIG. 1 shows a flowchart of the method according to an embodiment of the invention, FIG. 2 shows the reversible accentuation of identifiable and marked objects relative to a gray value/color display in the Hounsfield scale.

DETAILED DESCRIPTION OF THE PREFERRED EMBODIMENTS OF THE INVENTION

The method according to an embodiment of the invention will now be described with reference to a process flowchart according to FIG. 1. In a first process step S1, one or more image data records are displayed in a coupled manner in respective display windows of a computer screen. The basic image data records contain one or more objects to be marked (e.g. tumors) and are of a two- or three-dimensional nature.

Coupled display of an image data record device displaying the image data records in different display modes, but of corresponding view which can be changed dynamically and in the same direction of rotation (coupled). Thus, for example, in the case of an underlying 3D image data record, the display in a display window can include a 3D display of the object under examination (e.g. a patient's brain or liver), while any layer (2D layer) through this 3D image data record can be placed in an adjacent display window. According to an embodiment of the invention, the 3D display is designated e.g. as the main display and the 2D display as the secondary display in a case such as this.

In general the main display contains most information compared to other secondary displays in adjacent display windows distributed in some circumstances over a plurality of screens, or provides the user with an overview of the anatomical region in question. The image data records on which the secondary displays are based are usually three-dimensional and possibly originate from different imaging modalities such as CT, NM, MRT, PET, US, etc.

The reasoning behind a display being coupled in this way is, on the basis of the main display, to place the view in one or more secondary displays relative to the underlying image data record in such a way that the object to be marked is optimally intersected. Optimally means that the object center is intersected by the layer or that the layer of a secondary display shows the object to be marked in a highly contrasted manner.

In order to be able to find the object to be marked in a secondary display, it is possible for the user to rotate and/or move one or more corresponding starting layers in one or more displays as required until an optimum result has been achieved in respect of object display in at least one secondary display. The user is now able to select, as part of an object-determining first marking, the object to be marked in the central region e.g. using the mouse or via the cursor keys of the computer keyboard. The voxel selected is used as the initial point for further computer-based segmentation processes by which the object to be marked is delimited relative to its environment.

By selection alone, the position of the initial point is transferred to the computer in a second process step S2. This enables the computer—on the basis of this initial point—to perform an in some cases multicomponent analysis of the organ to be marked in a further process step S3. Multicomponent means that a sequence or a combination of pattern recognition techniques takes place in the environment of the initial point, resulting in a detailed high-resolution second marking of the entire organ region to be marked.

A multicomponent region analysis is necessary particularly as a single membership criterion (e.g. the gray value alone) is insufficient in order to differentiate between e.g. tumor-like tissue and its healthy environment. Additional morphological operations such as 2D or 3D texture recognition and/or 2D or 3D region growing and/or (gradient-based) edge detection are used.

By considering the adjacent voxels for object membership first adjacently to the initial point, then outward like layers of an onion, the object to be marked can be detected and marked mathematically and therefore automatically three-dimensionally, the resolution being able to be varied by the corresponding definition of adjacency. If it is limited to the six orthogonal (i.e. face-adjacent) cubes, a link via two voxels which only touch at one edge or corner is not possible. Very thin structures may thus be erroneously torn apart. If adjacency is selected too generously, on the other hand, things which do not belong together will possibly be merged.

In a fourth process step S4 the image data records present in the computer are reversibly coded on the basis of the detailed high-resolution second marking. The basic procedure is shown in FIG. 2. The gray values of an image data record are generally displayed via so-called lookup tables. In normal storage, e.g. of CT image data records, each voxel is assigned 12 bits of data memory, whereby up to 4096 different gray values can be stored according to the so-called Hounsfield scale (HU scale). A corresponding gray value assignment of bones in the upper range of the HU scale and of soft tissue in the lower range of the HU scale is shown on the left-hand side of FIG. 2.

By displaying only these values as gray values, it is impossible for the human eye to differentiate closely adjacent tissue in the HU scale. For this reason each voxel is assigned memory space of e.g. up to 16 bits, permitting a total of 65536 differentiation levels over and above the 4096 gray value gradations of the HU scale. The differentiation levels extend to the color and brightness scale onto which closely adjacent marked tissue in the HU scale is shifted by way of a transfer function. Such a shift e.g. in the yellow or red region is shown on the right-hand side of FIG. 2.

The shifting mechanism and the associated transfer function must, according to an embodiment of the invention, be so designed that the original HU value assignment is not lost, which has already been defined above as "reversible coding". The user is therefore able to switch back and forth between differentiating color coding and the original gray value-based HU scale.

The transition to extended color scale finally enables the object marked by the high-resolution second marking in the corresponding image data record to be optimally accentuated in respect of color and brightness in a fifth process step S5. The color and brightness are assigned on a user basis e.g. by parameter configuration of the underlying transfer function. After the fifth step S5 the user is faced with the question of whether further objects of the main data record are to be marked. If another object is to be marked, the process recommences at step S1 by means of which, via the user, a suitable secondary display is again found in which an initial point of said other object can again be selected. Only when all the objects have been marked and displayed in a readily differentiable manner according to step S5 is the process terminated.

According to an embodiment of the invention, various advantageous variants or possible extensions of the method according to an embodiment of the invention will be described below.

Thus it makes sense, for example, to limit the movement of a layer displayed in a secondary display to a single axis of rotation (e.g. parallel to the shoulder axis). This makes it easier for the user to orient himself when searching for the optimum layer position. In this case it is advisable to superimpose the corresponding direction of the (viewing direction defining) central eye ray on the secondary display for the user, e.g. by means of a corresponding direction indicator or arrow in the secondary display.

A possible extension of the method according to an embodiment of the invention is to have the computer find the initial point automatically as part of the first marking, at least one starting image data record being filtered in such a way that the central region of the object to be marked can be maximally contrasted and detected using image processing operations, in which case selection by the user is no longer required. In this case it is advantageous or necessary to acquire the underlying image data record on the basis of other imaging modalities (MRT, PET, US, etc.) in which the object to be marked shows better contrast.

It is further advisable and advantageous to perform the marking in a complementary manner. For this purpose, first only identifiable tissue is identified and premarked according to process steps S1 to S3, the difficult to identify regions (e.g. tumor tissue difficult to differentiate from the immediate environment) being omitted as enclosed unmarked regions. By inverting the marking, i.e. undoing the marking of the detected surrounding regions and marking the complementary set of the enclosed, as yet unmarked regions, these difficult to differentiate objects can be clearly displayed.

The method according to an embodiment of the invention can, for example, also be used as a training system in intervention—specifically in surgery—, in diagnosis or in therapeutic planning. In this case it is advantageous to superimpose a medical instrument in the marked image data record on the basis of an associated navigation system.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. Method for automatic object marking in medical imaging, comprising:
   coupled displaying of different display modes, of at least one image data record containing at least one object to be marked, in different display windows on at least one computer screen;
   transferring a position of an initial point, selected by a user as part of an object-determining first marking, to the computer;
   applying pattern recognition techniques to an environment of the initial point of the first marking, resulting in a detailed high-resolution second marking of the object;
   reversibly coding the second marking of the image data records present in the computer; and
   accentuating the marked object relative to its environment in the image data records on the screen.

2. Method according to claim 1, wherein, if a plurality of objects to be marked are present, the steps are repeated until all the objects to be marked are accentuated and displayed in a differentiable manner in the image data records.

3. Method according to claim 2, wherein, for coupled displaying, a display designated as the main display of an image data record appears in a first display window on a first screen, and at least one other display designated as the secondary display of at least one of this and other image data records takes place in other display windows likewise on at least one of the first and on other screens.

4. Method according to claim 2, wherein all the displays of the image data records in the display windows appear in the position, orientation and projection.

5. Method according to claim 2, wherein at least one secondary display is a layer-wise display which is at least one of rotatable and shiftable in space as required by the user.

6. A system which is suitable for implementing the method according to claim 2.

7. Computer software product adapted to implement a method according to claim 2 when run on computer equipment.

8. Method according to claim 1, wherein, for coupled displaying, a display designated as the main display of an image data record appears in a first display window on a first screen, and at least one other display designated as the secondary display of at least one of this and other image data records takes place in other display windows likewise on at least one of the first and on other screens.

9. Method according to claim 1, wherein all the displays of the image data records in the display windows appear in the position, orientation and projection.

10. Method according to claim 1, wherein at least one secondary display an object to be marked appears better contrasted as compared to at least one of the main display and other secondary displays.

11. Method according to claim 1, wherein at least one secondary display is a layer-wise display which is at least one of rotatable and shiftable in space as required by the user.

12. Method according to claim 11, wherein the rotation of a layer-wise display in the corresponding display image is limited to rotation about a single axis of rotation.

13. Method according to claim 12, wherein, in limiting rotation to a single axis of rotation, the viewing direction defined by the central eye ray is superimposed on the rotationally limited layer by way of suitable graphics.

14. Method according to claim 1, wherein the images of other secondary displays are images of different imaging modalities.

15. Method according to claim 1, wherein an initial point is found automatically by the computer as part of first marking.

16. Method according to claim 15, wherein, for automatic first marking, at least one image data record is filtered in such a way that, in it, the region of the object to be marked that is central for an initial point to be found can be maximally contrasted and localized automatically using image processing operations.

17. Method according to claim 15, wherein, for automatic finding of a starting voxel, images of other imaging modalities are used in which the central region of the object to be marked shows the best possible contrast.

18. Method according to claim 1, wherein the second marking is performed by at least one of measured value-based, texture-based, edge-based segmentation algorithms, iterative 2D or 3D dilation and 2D or 3D region growing.

19. Method according to claim 1, wherein the marked object is accentuated by at least one of newly defined color and brightness values in such a way that the object appears optimally delimited with respect to its environment.

20. Method according to claim 1, wherein the marking and accentuating of the object to be marked takes place in a complementary manner in so far as identifiable tissue is first identified and premarked and then all the non premarked enclosed voxel regions are marked and the premarking is undone.

21. Method according to claim 1, wherein a medical instrument is superimposed on the marked image data record on the basis of a navigation system.

22. A system which is suitable for implementing the method according to claim 1.

23. Computer software product adapted to implement a method according to claim 1 when run on computer equipment.

24. A system for object marking in medical imaging, comprising:
   a displaying device configured to display at least one image data record in different display windows of a display screen, the image data record containing at least one object to be marked;
   a selecting device configured to select a position of an initial point, selected as part of an object-determining first marking;
   a pattern recognition device configured to apply pattern recognition techniques to an environment of the initial point of the first marking, resulting in a detailed high-resolution second marking of the object;
   a coding device configured to reversibly code the second marking of the at least one image data record; and
   an accentuating device configured to accentuate the marked object relative to the environment of the marked object, in the at least one image data record on the display screen.

25. A method for object marking in medical imaging, comprising:

displaying at least one image data record, containing at least one object to be marked, in different display windows of a display screen;

selecting a position of an initial point, selected as part of an object-determining first marking;

applying pattern recognition techniques to an environment of the initial point of the first marking, resulting in a detailed high-resolution second marking of the object;

reversibly coding the second marking of the at least one image data record; and accentuating the marked object relative to the environment of the marked object, in the at least one image data record on the display screen.

26. Method according to claim 25, wherein, if a plurality of objects to be marked are present, the steps are repeated until all the objects to be marked are accentuated and displayed in a differentiable manner in the image data records.

* * * * *